United States Patent [19]
Vogel

[11] 3,949,352
[45] Apr. 6, 1976

[54] VELOCITY LOGGER FOR LOGGING INTERVALS

[75] Inventor: Charles B. Vogel, Houston, Tex.

[73] Assignee: Shell Oil Company, Houston, Tex.

[22] Filed: Jan. 17, 1969

[21] Appl. No.: 792,091

Related U.S. Application Data

[60] Division of Ser. No. 520,021, Dec. 13, 1965, Pat. No. 3,585,580, which is a continuation of Ser. No. 128,167, July 31, 1961, abandoned.

[52] U.S. Cl........... 340/15.5 BH; 340/15.5 SW; 340/15.5 TN
[51] Int. Cl.².......................................... G01V 1/40
[58] Field of Search.........340/15.5 SW, 15.5 BH, 340/15.5 TN; 250/256, 264; 181/15 PS

[56] References Cited
UNITED STATES PATENTS
3,406,776  10/1968  Henry ............................. 340/15.5

OTHER PUBLICATIONS
Rayleigh, The Theory of Sound, Vol. 1, Dover Publications, New York, 1945, pp. 84 and 85.

Officer, Introduction to the Theory of Sound Transmission With Application to the Ocean, McGraw—Hill Book Co., New York, 1958.

Primary Examiner—Nelson Moskowitz
Attorney, Agent, or Firm—Theodore E. Bieber

[57] ABSTRACT

Method and apparatus for acoustically logging of a borehole wherein a beam of ultrasonic energy is transmitted from the borehole to the formation to produce substantially only shear waves in the formation. The shear waves are received at a position spaced from the point at which the acoustical waves were generated. The system includes means to measure the time required for the shear waves to travel from the transmitting point to the receiving point and/or the reduction in amplitude of the received shear waves.

5 Claims, 14 Drawing Figures

INVENTOR:
C. B. VOGEL

HIS ATTORNEY

INVENTOR:
C. B. VOGEL

HIS ATTORNEY

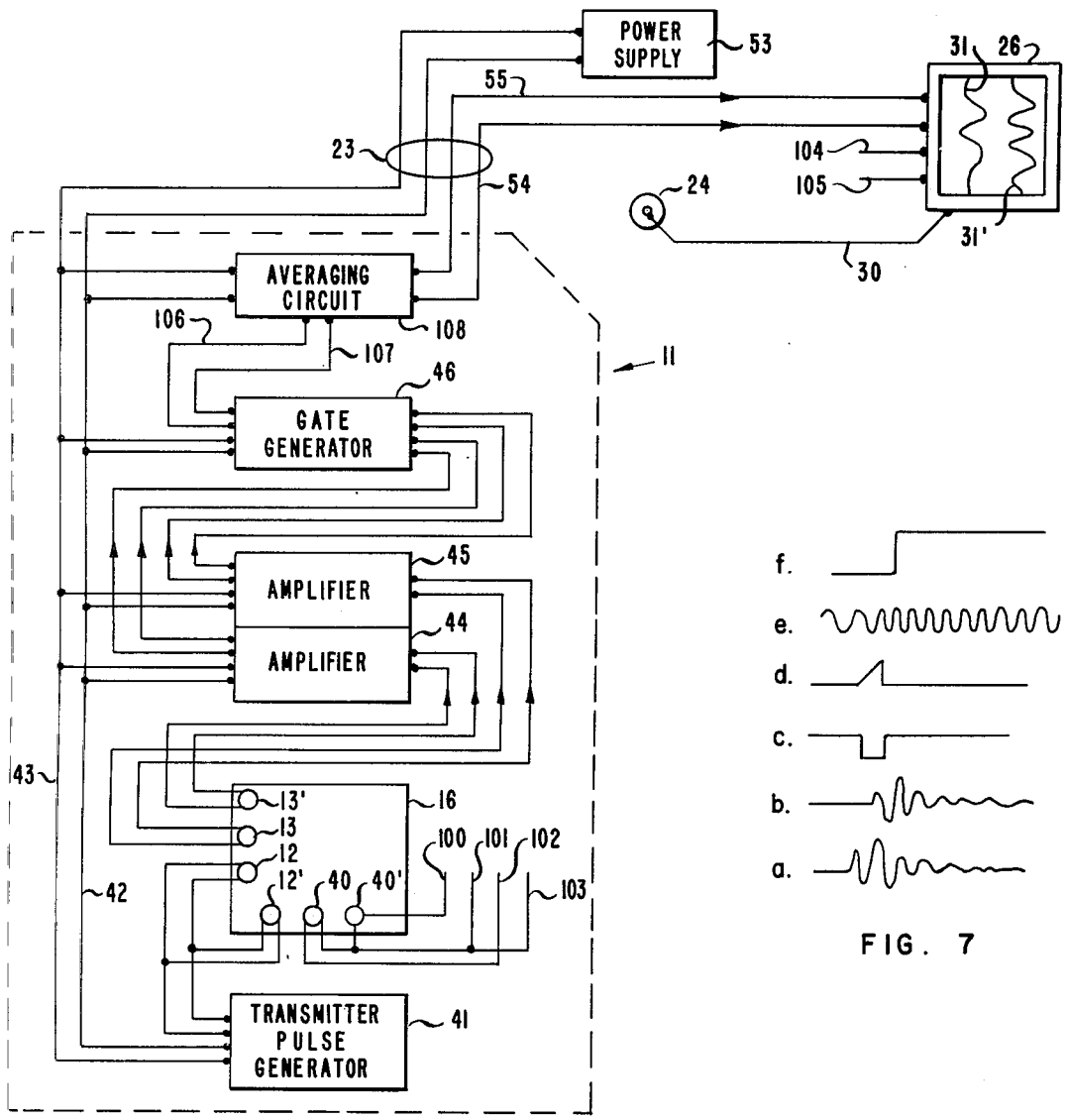
FIG. 8
FIG. 7
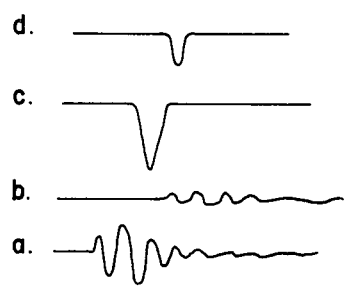
FIG. 12

INVENTOR:
C. B. VOGEL

HIS ATTORNEY

INVENTOR:
C. B. VOGEL
HIS ATTORNEY

VELOCITY LOGGER FOR LOGGING INTERVALS

This application is a divisional of patent application Ser. No. 520,021, filed Dec. 13, 1965, now U.S. Pat. No. 3,585,580, which in turn is a continuation of patent application Ser. No. 128,167, filed July 31, 1961, which application is now abandoned.

The invention pertains to logging of earth formations penetrated by a borehole and more particularly to a method and apparatus for acoustical logging of the formations over very short intervals.

At the present time it is the practice in the art of acoustical well logging to measure the compressional wave velocity of acoustical waves over intervals of a few feet. Moreover, experiments have shown that the porosity, density and fluid content of rocks are related to the amplitude of acoustic compressional waves transmitted or refracted therethrough and to the attenuation with distance of said amplitude. These rock properties have been found also related to the velocity, amplitude, and attenuation of transverse waves propagated through rock formations. For most purposes measurements over intervals of 1 to a few feet are satisfactory since they provide information relating to the average properties of the formation surrounding the borehole. In some cases the earth formations are very inhomogeneous and the acoustical logging over distances of a few feet do not give sufficient information to accurately characterize the formation in question. As an example, in vuggy carbonate formations the average value of porosity over a thickness of a foot or more may be on the order of 1% while the discrete value of porosity over distances of a few inches may be as high as 10%. In such a case the discrete value of porosity is important in determining the amount of hydrocarbons which may be present in the formation and whether it is likely to be producible. In other cases the formation may comprise very thin alternating shale and sand beds which may not be detected as separate layers by conventional logging methods, thus giving rise to erroneous interpretations as to the presence of entrapped hydrocarbons.

In addition to the above, it recently has been suggested that at least one axis of anisotropy of a formation may be determined by measuring a characteristic of the formation in a direction parallel to the bedding planes of the formations. The direction of maximum response indicates one axis of anisotropy which may be the direction of the alignment of the grains of the formation or the alignment of the permeability of the formation. A method for determining the axis of anisotropy is the measurement of the acoustical velocity of the formation over short intervals located around the circumference of a borehole or sample. Also, comparisons of velocity and other transmission properties measured in directions parallel to the bedding with those measured in directions perpendicular to the bedding serve to characterize rock types and thus provide a means of identification. For example, in shales the ratio of these velocities may be 2, whereas in limestone the ratio is nearly 1; intermediate values occur in sands and sandstones. In sandstones the value of the ratio will indicate the degree of compaction.

Furthermore, acoustical measurements are not substantially affected by electrical properties of the mud filtrate and formation water filling the borehole; thus they give more accurate results than are sometimes obtained by electrical measurements. In many formations the changes in the properties of the formations are of small magnitude and will not be detected unless accurate high-resolution logging systems are used.

Accordingly, it is the principal object of this invention to provide a novel acoustical logging system capable of determining the acoustical transmission properties over an interval of less than 1 foot of a formation penetrated by a borehole.

A further object of this invention is to provide a unique acoustical logging system for determining the acoustical transmission properties over short intervals, in which system the transmitting and receiving transducers are urged into contact with the formation.

A still further object of this invention is to provide an acoustic logging system capable of measuring the acoustic transmission characteristics of a formation in respect to acoustic waves which propagate through the formation in different directions, as for example, the velocities at which an acoustic compressional wave propagates through the formation in different directions.

The above objects and advantages of this invention are achieved by providing a logging system using a downhole tool having at least one transmitting transducer and one receiving transducer spaced less than one foot and a biasing means for urging the transducers into contact with or close proximity to the formation. The downhole tool is then moved through the borehole to measure the changes in the acoustical transmission characteristic for the interval between the transducers. The transmitting transducer is designed and energized to generate acoustical wave trains having frequencies of 50 kilocycles or more and preferably greater than 100 kilocycles. Similarly, the receiving transducer is arranged to respond predominantly only to frequencies of 50 kilocycles or more. Furthermore, the transducer transmitter-receiver configuration is made highly directional to respond preferentially to waves traveling in the formation and to waves propagating therein with velocities within a preselected range. The direction of maximum response of the transducers is made to be inclined at an angle less than 90° from the normal to the borehole wall and preferably about 10° – 30° from said normal. These are important features of this invention since they allow the transducers or the necessary transducer holders to rub against the formations as the downhole tool is moved through the formations without interfering with the operation of the system. The frequency of the noise generated by the movement and rubbing of the downhole tool through the formation is well below the 50 kilocycle or higher frequency used in the instrument. Since the interval over which acoustic transmission is measured is short and the transducers are held in contact with or closely adjacent to the formation, the transmitted or refracted high frequency acoustical energy will vary in response to even very thin zones exhibiting variations of porosity or other rock properties, whereas these thin zones might be undetected by conventional methods. Where the transmission properties of the formation are measured over an interval between horizontally spaced transducers, there is, moreover, the added advantage that only a single very thin layer or bed is measured at any instant, since the earth is generally substantially horizontally layered or bedded.

The above objects and advantages will be more easily understood from the following detailed description of a preferred embodiment when taken in conjunction with the attached drawings in which:

FIGS. 7a–7f show a series of wave forms of signals which appear in various portions of the circuit of FIG. 5.

FIG. 8 is a preferred embodiment of the well logging system of FIG. 1 for measuring the velocity of transverse waves and for measurements not requiring the highest accuracy, with the required electronic circuits shown in block diagram form;

FIG. 12 shows waveforms produced by the circuitry of FIG. 11; and,

Figure 1:
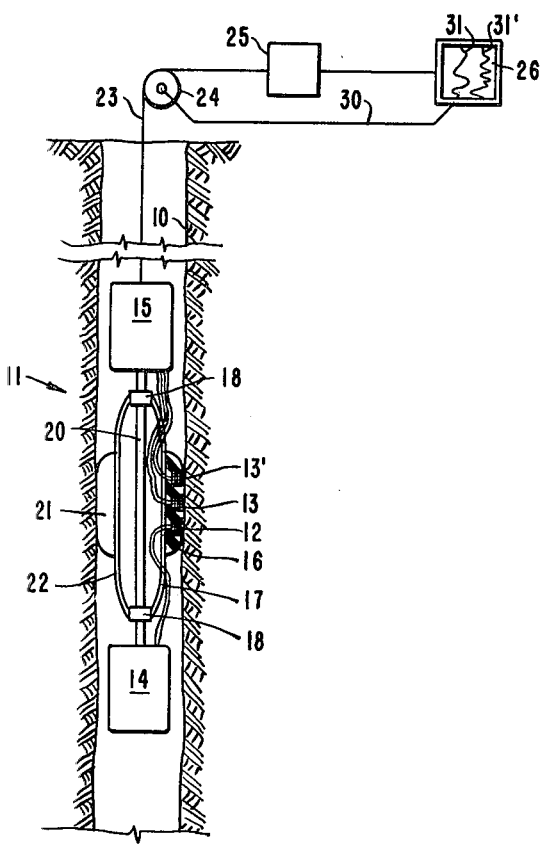
FIG. 1 shows an acoustical well logging system utilizing this invention.

Referring now to FIG. 1, there is shown a downhole logging tool 11 which is suspended in a borehole 10 at the end of a multi-conductor cable 23. The downhole logging tool has a transmitting transducer 12 and one or more receiving transducers 13 and 13'. Preferably four receiving transducers are used, though only two are shown here in FIG. 1. The transmitting and receiving transducers may have substantially the same construction and may be of the piezo electric type. In addition, both transducers should operate at 50 kilocycles or more and preferably at a frequency higher than 100 kcs in order that the transmitter will generate acoustical impulses having a frequency of at least 50 kilocycles and the receiver will discriminate against impulses below 50 kilocycles. Furthermore, the receiving and transmitting transducers have the required directionality and directions of maximum response as described below with reference to FIG. 2. All the transducers 12, 13 and 13' are mounted in a pad or shoe 16 and are spaced from each other a distance of a few inches and in all cases a distance of less than 1 foot. The required electrical circuits for the transmitting transducer 12 are carried in a housing 14 at the end of the logging instrument while the required electrical circuits for the receiving transducer 13 are carried in a housing 15 at the upper end of the instrument. The instrument housings 14 and 15 are mounted on the ends of a supporting rod 20 which also serves to maintain them in a spaced relationship. The pad 16 is mounted on a bow spring 17 at the center thereof with the ends of the spring secured to separate collars 18. The two collars 18 are disposed for sliding movement along the rod 20 which couples the two housings 14 and 15 together. A second pad 21 is mounted on a second bow spring 22 whose ends are attached to the two collars 18 diametrically opposite the ends of the bow spring 17.

From the above description it is easily seen that a logging instrument has been provided in which two or more closely-spaced transducers are mounted in a pad which is biased into contact with or close proximity to the wall of the borehole 10. This contact is insured by mounting the two pads 16 and 21 and associated springs diametrically opposite each other. The instrument also provides suitable housings for the electrical circuits required for energizing the transmitting transducer 12 and transmitting signals derived from the receiving transducers 13 and 13' to the surface over the conductors contained in the cable 23.

The cable 23 passes over a measuring sheave 24 at the surface which preferably includes a selsyn type unit. Thus, the position of the instrument 11 within the borehole 10 may be accurately determined at all times. The cable 23 is connected to a suitable electrical circuit 25 which converts the signals derived from the receiving transducers 13 and 13' to a related electrical analog signal. The electrical analog signals are functions of the velocity or other transmission properties of the acoustical pulses through the formation between the transducers. The electrical analog signals are recorded on a strip chart recorder, an oscilloscope, or other suitable device 26 and may appear as recordings 31 and 31' thereon. The selsyn unit in the measuring sheave 24 is coupled to the recorder 26 by a conductor cable 30 in order that the chart record of the recorder will be advanced in direct proportional to the position of the instrument within the borehole.

Figure 2:
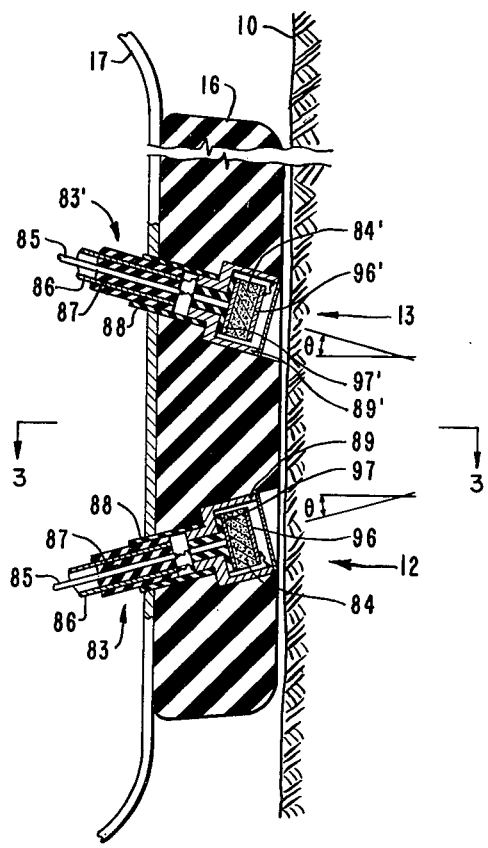
FIG. 2 is an enlarged vertical section of the transducers and transducer mounting pad shown in FIG. 1.
Figure 3:
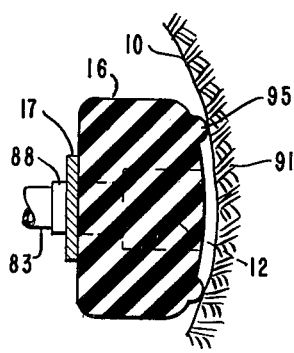
FIG. 3 is a horizontal section taken along line 3—3 of FIG. 2 and showing the construction of the transducer mounting pad.

Referring now to FIGS. 2 and 3 there are shown the essential details of the construction of the transducers and transducer mounting pad 16. FIG. 2 shows a vertical cross-section and FIG. 3 a horizontal cross-section of the pad 16 and transducers. Since the construction and geometrical disposition of receiving transducers 13 and 13' are identical, only receiving transducer 13 is shown. The transducer mounting pad 16 is fixedly attached to the bow spring 17 as by moulding the pad from rubber or in another suitable manner. The pad itself is preferably constructed of hard rubber or some other slightly resilient material in which the attenuation of ultrasonic waves is very high, but may be of a rigid material such as a metal if the measuring circuits are designed to respond only to higher frequencies, such as 1 megacycle. The transducers preferably contain as active elements disc-shaped bodies 84 of a piezo-electric or electro-strictive material such as lead-zirconium-titanate on the flat surfaces of which have been deposited metallic electrodes 96, 97, 96' and 97'. These disc-shaped bodies are preferably approximately 0.5 in. in diameter and 0.1 in. in thickness. They serve in effect as piston sound sources when used at a high frequency. For example, when the driving frequency is 200 kc, the wavelength in water is approximately 0.3 inch and the transmitting disc is in effect a piston source with a diameter of 1.5 wavelengths.

Figures 4A, 4B, 5:
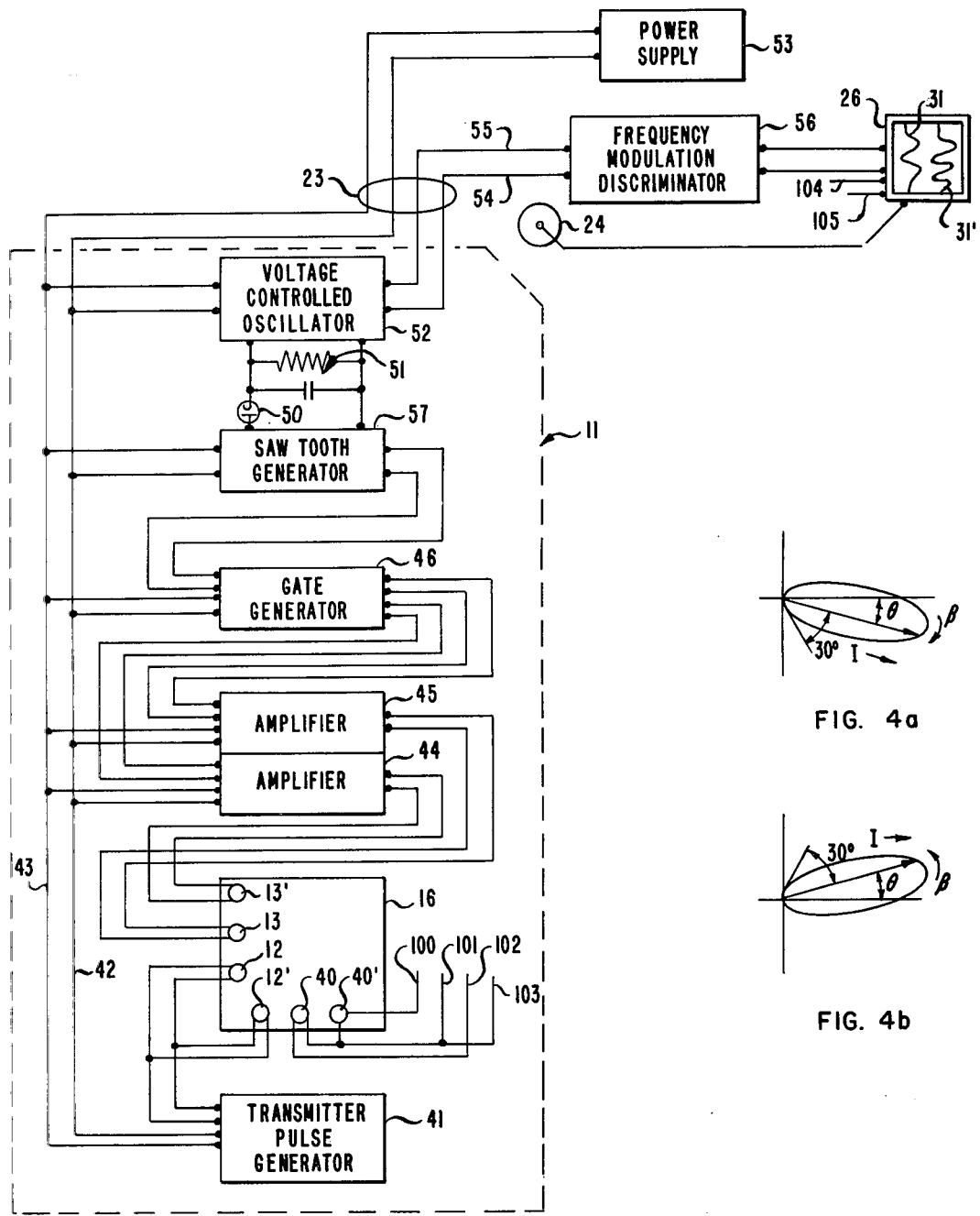
FIGS 4a and 4b are polar plots of the sensitivity of the transducers.
FIG. 5 is a well logging system of FIG. 1 with the required electronic circuits shown in block diagram form.

Under these conditions the transmitting transducers emit a highly directional narrow beam of plane waves of acoustic energy and the receiving transducers have corresponding narrow directional response patterns. These directional characteristics are illustrated by the polar plots of FIGS. 4a and 4b. FIG. 4a is a polar plot of the relative power sensitivity of the above-described transducer acting as a receiver and containing a 0.5 inch diameter by 0.1 inch thickness vibrating disc operated at 200 kcs in water — plotted as a function of the angle measured between the normal to the borehole wall and the direction of travel of an impinging wave. The radius vector length I in the polar plot is proportional to the said receiving power sensitivity and the plot indicates that the sensitivity in the direction of maximum response is about 10 times as great as the sensitivity in a direction making a 30° angle with said direction of maximum response. Similarly, the relative intensity of the wave emitted by an identical transducer serving as transmitter is approximately 10 times as great in the direction of maximum intensity as in a direction making a 30° angle with said direction of maximum intensity. This is shown by the polar plot of FIG. 4b in which I is proportional to intensity. As shown in FIG. 2, both receiving and transmitting transducers have their axes inclined to the borehole wall so that the respective angles included between normals to said wall and said axes are respectively equal to the angle $\Theta$. This angle is preferably chosen so that its sine is equal to the ratio of the velocity of the liquid in the borehole to the velocity of the earth formation making up the borehole wall. For measuring the transmission properties of compressional waves, this angle may be set equal approximately to 30° in which case reasonably satisfactory measurements can be obtained in materials having a wide range of acoustic velocities, though in this case optimum results will be obtained when the earth formation of the borehole wall has an acoustic velocity of approximately 10,000 ft. per second. The angle $\Theta$ is in any case chosen so that the geometrical axes of the receiving transducers will intersect the axis of the corresponding transmitting transducer within the earth formation behind the wall as indicated in FIG. 2. In this way the transducer system is preferentially responsive to waves traveling in the earth formation of the borehole wall from transmitter to receiver with velocity within a desired range of variation rather than the waves arriving from random directions such as might be produced by noise of rubbing, or to waves traveling in well mud or to waves traveling in the pad structure.

As indicated in FIG. 2, the transducers are held at the desired angle with respect to the borehole wall by means of inclined cylindrical mounting channels 89 and 89' within which the transducers themselves are fixedly mounted as by set screws, plastic cement, or by other suitable means.

The electrodes 96, 97, 96' and 97' of the transducers are respectively connected by solder or otherwise to respective coaxial cables 83 and 83', each comprising solid cylindrical central conductor 85, hollow cylindrical insulating member 87, hollow cylindrical conductor 86 and an outer hollow cylindrical insulating member. The transducers themselves comprise cup-like structures, preferably metallic, in which are mounted the active elements 84 and 84' which are in turn covered externally by a protective diaphragm, preferably metallic or plastic. As shown in FIG. 2, one electrode 96 of the active element 84 of transducer 12 is connected to the metallic transducer case and thence to the outer hollow cylindrical conductor 86, while the inner electrode 97 of the active element 84 is connected to the central cylindrical conductor 85. The electrodes of the active element 84' are connected in a similar manner to conductors 85 and 86 of the cable 83'. As shown in FIG. 2 there is preferably a clear space between the circumferential surface of the elements 84 and the containing cup-like transducer case. This space and the entire interior of the transducer case is preferably filled with some insulating liquid, such as silicone oil. Hollow cylindrical rubber boots 88 are preferably used to seal the connections between the coaxial cables 83 and 83' and the transducer case.

FIG. 3 shows a horizontal cross-section view of pad 16 taken along line 3—3 of FIG. 2. This shows that there are molded or otherwise incorporated into the pad exterior structure longitudinal ridges 95 which serve as means for holding the transducers and the pad a short distance away from the borehole wall 10 so that mud can flow between this space, thus reducing rubbing noise and minimizing the collection of mud cake which otherwise might collect excessively on the pad. Other means might be used for this purpose, such as a series of small bumps or protuberances.

The foregoing have described in detail the use of only a single transmitting and a single receiving transducer. However, the other transducers used in this invention are preferably identical or similar to the two described, except for their positions or angle of axial inclination as described above and hereinafter.

Referring now to FIG. 5, there are shown the electrical circuits required for operating both the downhole instrument and surface recording instrument of the logging system shown in FIG. 1. In addition to the transducers 12 and 13 and 13' of FIG. 1, a second set of transducers 12' 40 and 40', not shown in FIG. 1, are also disposed on the mounting pad 16. These are shown in FIG. 5. The second set of transducers 12', 40 and 40' are preferably spaced horizontally by distances equal to the corresponding vertical distances between 12, 13 and 13'. With this arrangement it is possible to detect differences between the horizontal and vertical velocities in the formation. This information is helpful in detecting anisotropies within the formation as well as for determining the porosity and other characteristics of the formation. The transmitting transducers 12 and 12' are coupled to a pulse generating circuit 41. The pulse generating circuit 41 in turn is coupled to a power supply 53 located at the surface by means of conductors 42 and 43 contained in the multi-conductor cable 23. The pulse generating circuit 41 is designed to supply intermittent pulses to the transmitting transducers 12 and 12' for energizing them with wave trains having a frequency of more than 50 kilocycles. The receiving transducers 13, 13' are coupled to amplifiers 45 and 44, respectively, with the two amplifiers being coupled to a gate generator circuit 46. The amplifiers are coupled to the gate generator circuit in the proper relation in order that it will begin the generation of a gate or square wave pulse when an acoustical impulse generated by the transducer 12 is received by the transducer 13 and will terminate the pulse when the same acoustic pulse is received by the receiver 13'. The gate pulses from the gate 46 are coupled to a voltage generating circuit 57. The voltage generating circuit 57 should generate a voltage having a saw-toothed wave form which commences with the starting of the gating pulse and ceases at the end of the gating pulse. The voltage pulse from the voltage generator 57 is coupled to a voltage controlled oscillator 52 through a diode rectifier 50 and filtering circuit 51. The voltage controlled oscillator 52 will thus supply an output signal whose frequency will be related to the velocity of the earth formation between receivers 13 and 13'. The output signal from the oscillator 52 is transmitted to the surface over two conductors 54 and 55 contained in the cable 23 and supplied to a frequency modulation discriminator 56. The discriminator 56 converts the signal from the oscillator 52 to an electrical analog signal, the amplitude of which is proportional to the instantaneous frequency of the downhole oscillator. The signal from the discriminator 56 is then recorded on the chart record 26 as explained above with relation to FIG. 1.

From the above description, it is seen that electrical circuits have been provided which will energize the transmitting transducer 12 to generate acoustical impulses having a high frequency and then convert the travel time of this pulse between the vertically-spaced receivers to a frequency modulated signal. The frequency modulated signal is transmitted to the surface where it is converted to an electrical analog and recorded as recording 31. Thus, the recorded signal will be directly related to the vertical travel times of the acoustical pulse. The travel time, of course, is inversely proportional to the actual velocity. If one desired a recording of the actual vertical velocity in the formation the signal from the discriminator 56 could be converted to its reciprocal and then recorded to give a recording directly in velocity.

In a similar manner the outputs of the horizontally spaced transducers 40 and 40' are connected to corresponding amplifiers, gate generator, voltage controlled oscillator, frequency modulation discriminator and recorder to produce corresponding second recording trace 31'. These corresponding electronic components for transducers 40 and 40' are not shown, as they are identical with those used for transducers 13 and 13'. It is, of course, clear that digital recording may be used in place of the analog recording described for the sake of illustration.

Figure 6:
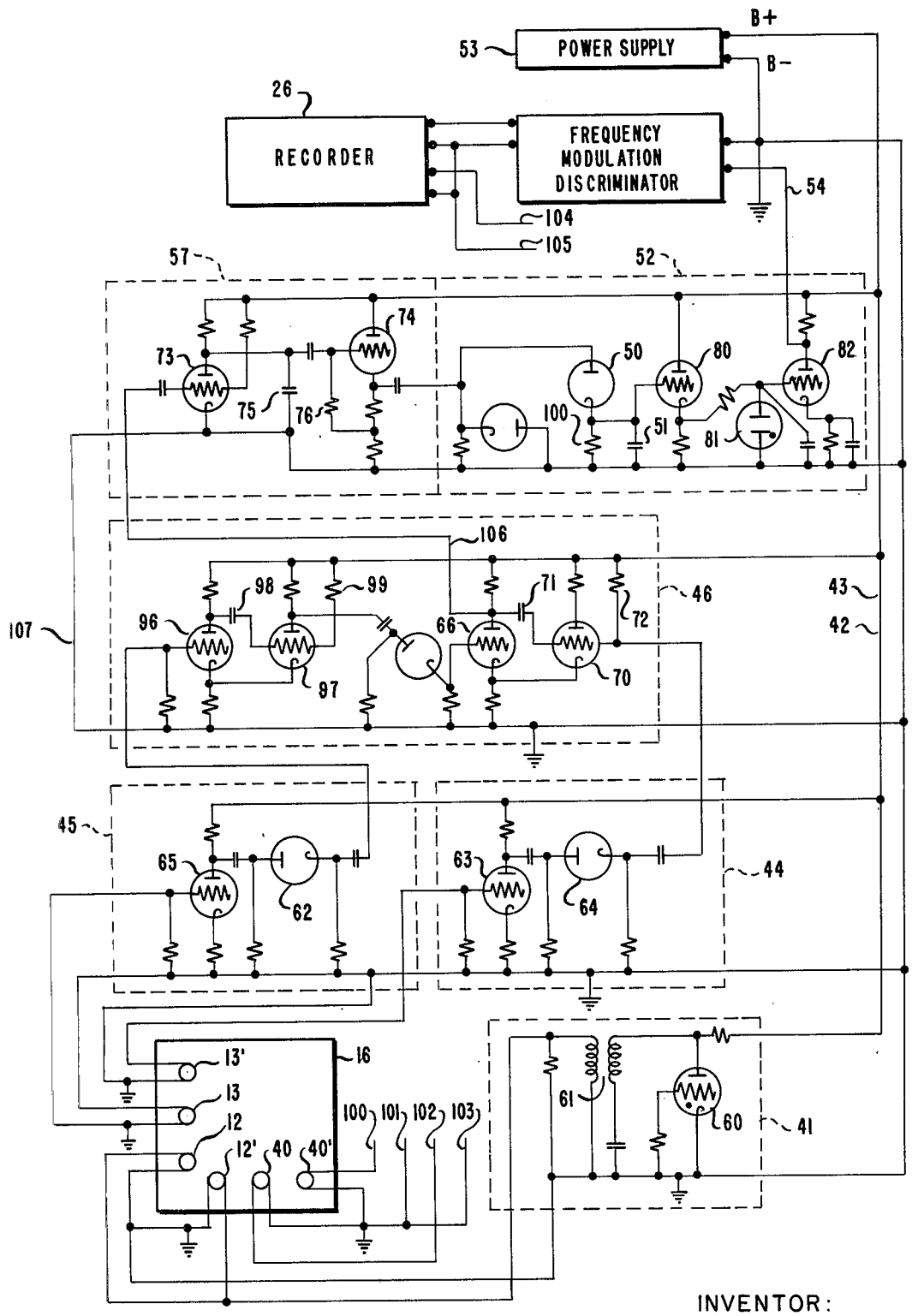
FIG. 6 is a schematic drawing of the electronic circuits required by the well logging system of FIG. 1.

Referring now to FIG. 6, there is shown a detailed drawing of the electrical circuits used in the downhole instrument of FIG. 1.

Shown in FIG. 6 is a gas-filled triode 60, for example, a thyratron, which upon reaching a certain voltage breaks down and conducts to generate a short electrical pulse. The pulse generated by the thyratron 60 is supplied to the transmitting transducers 12 and 12' through a transformer 61. The transformer 61, of course, increases the voltage to the level required for energizing the transducers 12 and 12'. The thyratron plate is connected to the B+ supply by means of conductor 43, while the cathode is connected to the ground or the B— side of the power supply by means of conductor 42. The time constant of the circuit associated with the thyratron 60 should be chosen to provide a periodic pulse every 10 milliseconds.

The vertically-spaced receiving transducers 13 and 13' are coupled to their respective amplifiers 45 and 44. The amplifier outputs are connected to diodes 62 and 64 respectively. It should be noted that these diodes are connected to pass positive pulses only to the control grids of vacuum tubes 96 and 70 respectively. One side of each transducer is connected to ground and the transducers are so polarized that the first impulses produced by the respective receiver transducers are negative and will thus result in production of positive pulses on the amplifier plates which will be transferred through diodes 62 and 64 to other parts of the circuits. Also each transducer has connected across it a leakage resistor to dissipate charges built up by changes of hydrostatic pressure with the borehole.

From the above description it can be readily appreciated that the thyratron 60 will supply periodic pulses for energizing the transducers 12 and 12'. The pulses supplied to the transducer will generate high frequency acoustical impulses which are received by the transducers 13, 13' and 40, 40'. The transducers 13, 13', 40 and 40' convert the received acoustical impulses to related electrical signals which are transmitted to the remainder of the circuit. As explained above, the receiving transducers 13, 13', 40 and 40' should be designed to discriminate against acoustical impulses below 50 kilocycles. The receiving transducers are coupled by amplifiers and diodes to the remainder of the circuits.

The gating circuit 46 will begin receiving positive pulses when the transducer 13 receives an acoustical impulse and will be triggered on by the first of these positive pulses as explained in the following. The gating circuit 46 preferably comprises two monostable multivibrators. Triodes 66 and 70 comprise one monostable multi-vibrator, with the plate of the triode 66 being coupled to the grid of the triode 70 through a capacitance 71 and resistance 72. Similarly, triodes 96 and 97 comprise a second mono-stable multi-vibrator, with the plate of triode 98 being coupled to the grid of triode 97 through capacitance 98 and resistance 99. Now the resistance 99 and the capacitor 98 are chosen of such value as to make the on time of the corresponding multi-vibrator, once triggered, equal to 5 milliseconds. Now triode 96 is normally not conducting, and triode 97 is normally conducting. When the beginning of the acoustic impulse impinging upon receiving transducer 13 is received, the transducer output is amplified and in the process has its polarity reversed or inverted, so that there is transmitted to the grid of triode 96 through diode 62 a positive pulse, and this pulse triggers the corresponding monostable multi-vibrator to the condition in which triode 96 conducts and triode 97 does not conduct. The duration of this condition, that is, the duration of the period of conduction for triode 96 is controlled by the value of resistor 99 and capacitor 98 and these components are chosen to make the conduction time of triode 96 approximately 5 milliseconds, which is a much longer period of time than is required for the sound pulse to travel from one to the other of the transducers and is much longer than the duration of the electrical signals produced by receiving transducer 13 in response to an impinging acoustic pulse or wave train.

When triode 91 is cut off and ceases to conduct, it produces a positive pulse which is differentiated and transmitted through a diode to the grid of triode 66. As a result of this differentiated positive pulse, the monostable multi-vibrator comprising triodes 66 and 70 is triggered into the condition in which triode 66, normally not conducting, suddenly begins to conduct. Now the resistor 72 and the capacitor 71 are chosen so that the duration of the conduction period for triode 66 would normally be of the order of 5 milliseconds unless an external pulse is applied to reduce this time. Actually, the duration of the conducting period for triode 66 is reduced as will be explained in the following. When an acoustic impulse impinges upon receiving transducer 13', this device produces electrical signals which result in the production of positive signals at the grid of triode 70. Now, signals are produced by receiving transducer 13' only after signals have been first produced in response to an acoustic pulse or wave train impinging upon receiving transducer 13. Therefore, the first positive signal reaching the grid of triode 70 from diode 64 triggers the monostable multi-vibrator comprising triodes 66 and 70 back into its normal condition in which triode 70 conducts and triode 66 does not. As a result of the above-described operations, there is produced on the plate of triode 66 a unidirectional transient waveform, namely, a negative rectangular wave, or gating pulse, which begins with reception of an acoustic pulse at transducer 13 and terminates with reception of an acoustic pulse at transducer 13'. This unidirectional waveform, or gating pulse, will have a width which will be substantially equal to the time required for an acoustic pulse to travel from transducer 13 to transducer 13'.

The gating pulse is supplied to the voltage generator 57 which consists of a single triode stage 73 and a cathode follower stage 74. The output from the triode 73 is coupled to the cathode follower through a capacitance 75. When the negative gating pulse is applied to the grid of the triode 73 it will cause the triode to cease conduction thus increasing the positive voltage appearing on the plate of the triode 73. The rate of increase of this positive voltage will be controlled by the time constant of the plate circuit of triode 73. The voltage pulse from the triode 73 will be amplified by the cathode follower and supplied to the voltage controlled oscillator 52 by means of the rectifying diode 50 and the filter circuit made up of capacitor 51 and a large resistor 100. Thus, the voltage generating circuit 57 and associated diode 50 and filtering circuit will convert the width or time of the gating pulse from the gate 46 to a related direct current signal whose amplitude will be proportional to the width or time of the gate.

The voltage controlled oscillator 52 consists mainly of diodes, of a triode cathode follower stage 80, of a neon tube relaxation oscillator 81, and of a triode amplifier stage 82. The frequency of oscillation of the neon tube 81 is controlled by the above-described direct current signal or voltage. Thus, when the direct current voltage from the rectifier 50 and filter circuit 51 is applied to the grid of the triode 80 the frequency of oscillation of the neon tube circuit will change in direct proportion of the amplitude of the applied signal. The signal from the oscillator 81 is amplified by the triode 82, the output signal of which is transmitted by means of leads 54 and 42 to the surface-located discriminator 56.

The operation of the above-described circuit can be more easily understood by referring to FIG. 7 where the waveforms of the signals appearing in the various circuits are shown. FIG. 7a illustrates the waveform of the signal generated by the receiver 13 when it receives the acoustical impulse. Similarly, FIG. 7b illustrates the waveform of the electrical signal generated by the receiver 13' when it receives the acoustical pulse. As explained above, these two signals are applied through suitable circuitry to a gate circuit. The gate circuit will generate a voltage signal having a waveform as shown in FIG. 7c. As is seen, the output signal from the gate circuit has a rectangular waveform whose width is proportional to the travel time of the acoustical signal from receiver 13 to receiver 13'.

The voltage signal from the gate circuit is used to energize the saw-toothed voltage generator 57 which results in an output voltage signal having the form as shown in FIG. 7d. The amplitude of this signal will be directly proportional to the width of the gating pulse. The peak amplitude of this signal is used to control the frequency of oscillation of the oscillator 52. This will result in an output signal from the oscillator 52 having a waveform similar to that shown in FIG. 7e. It will be noted that this signal has a constant frequency on the left which increases abruptly to a higher frequency which is related to the amplitude of the voltage signal passed by the rectifying diode 50 and associated filter circuit. As explained above, the frequency modulated signal received from the downhole tool will be converted by the discriminator 56 to a related analog signal as illustrated by waveform of FIG. 7f, which may be recorded by the chart recorder 26. Also, as explained above, if a record in terms of velocity is required the reciprocal of the analog signal should be recorded instead of the actual output signal of the discriminator 56.

The foregoing has described the operation of apparatus which may be used to practice this invention, but only with respect to receiver transducers 13 and 13' and transmitter transducer 12. As illustrated in the foregoing figures, the apparatus preferably contains additional receiver transducers 40 and 40' and transmitter transducer 12' for measuring the velocity of waves traveling a horizontal path between said receivers. The following now describes the connection and operation of transducers 12', 40 and 40' and of the associated circuitry.

Transmitter transducer 12' may be connected in parallel with transducer 12 so that waves will propagate simultaneously along respective vertical and horizontal paths past the corresponding pairs of receiver transducers.

Receiver transducers 40 and 40' are connected to circuitry essentially identical to that used with transducers 13 and 13', as indicated in FIGS. 5 and 6 by leads 100, 101, 102 and 103. Furthermore, the electronic circuitry used with transducers 40 and 40', as in the case of transducers 13 and 13', results in the production of signals by a frequency modulation discriminator identical to discriminator 56, said signals being fed into the recorder 26 as indicated by leads 104 and 105 of FIGS. 5 and 6 to produce on the recorder chart the trace 31' shown in FIGS. 1 and 5.

Thus, the apparatus produces two traces showing respectively the time required for a sound wave to travel both a short vertical distance and a short horizontal distance in the earth material penetrated by a borehole.

Referring now to FIG. 8, there is here illustrated a preferred embodiment comprising an alternative circuitry and method for recording the vertical and horizontal velocities referred to above. This circuitry and method, though not normally capable of as great accuracy as is that hitherto described, is capable of a high degree of precision and effects a considerable simplification and cost reduction of the apparatus.

The apparatus illustrated by FIG. 8 is in some respects identical to that of FIGS. 5 and 6 and the same numerals will be used with only the differences being described in the following. In FIG. 8, the unidirectional transient waveform produced by the gate generator is fed into a special kind of averaging circuit 108 rather than into a saw-tooth generator 57 as in FIGS. 5 and 6. This averaging circuit is so devised that it produces an output voltage proportional to the average amplitude of the unidirectional waveform produced by gate generator 46 when this amplitude is averaged over a time interval long compared with the time intervening between the successive production of pulses by the transmitter pulse generator 41. Since the instantaneous amplitude of the unidirectional waveform is substantially constant, the output of the averaging circuit is thus proportional to the width of the unidirectional waveform. The averaging circuit 108 thus produces a substantially dc voltage which fluctuates relatively slowly in response to variations in the acoustic properties of the earth formation being logged. Since, the fluctuation is relatively slow, an equilibrium value representing the acoustic properties of the earth at a given depth is reached only after several successive pulses from the transmitter pulse generator have been emitted at substantially that given depth. This is in distinction to older methods in which monotonically varying voltages are generated by charging a condenser so that the voltage or charge on the condenser, that is to say, the peak voltage on the condenser is proportional to the width of the single immediately preceding pulse. In these older methods the apparatus is susceptible to operating difficulties if there are introduced into the circuits interfering stray transients coupled from the transmitter circuits with large values of peak voltage. With the older circuits such interfering stray coupled transients will result in the condenser being charged to a peak voltage controlled by the amplitude of the interfering transients rather than by the width of the gate pulses. With the method and circuitry used in the averaging circuit 108 these difficulties are substantially eliminated, since the possible unintentional introduction into the averaging circuit of recurrent interfering transients will merely result in a shift of the zero for the recorder scale, but will not obliterate the effect of the gate pulse variations as in the case of apparatus using the older methods. The improvement effected by use of the special averaging circuit 108 is of special importance when very high frequency pulses and very short travel times are used, since the transients produced by transmitter circuits involved in such use are especially susceptible to unintentional coupling into various circuits by stray capacitance between wires and components. This is because the transients produced have component with frequencies exceeding several megacylcles, and it is well known to those skilled in the art that cross-coupling between circuits carrying such frequencies in a difficult problem, especially in well logging instruments. As shown by FIG. 8, the output voltage of the averaging circuit 108, which is in the subsurface portion of the instrumentation, is coupled operatively to a recorder 26 in which are recorded traces 31 and 31' to indicate by deflections the acoustical properties of the earth formation being logged.

Figure 9:
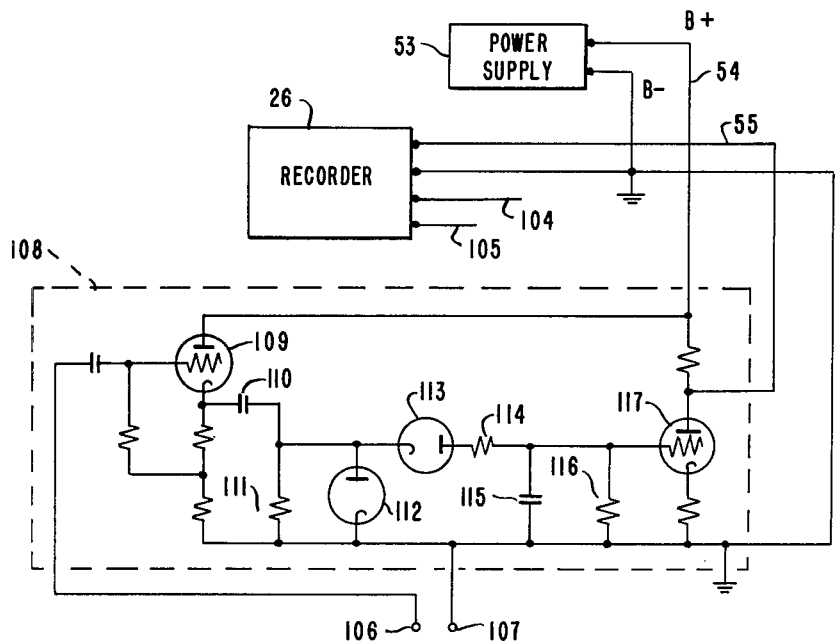
FIG. 9 is a schematic drawing of the electronic circuits required by the well logging system of FIG. 8.

With reference to FIG. 9, there is here shown a detailed schematic diagram of the special averaging circuit 108. This circuit is connected to the output lead 106 of the gate generator 46 and to the ground lead 107 of said gate generator. Gate pulses are fed by lead 106 to a cathode follower circuit comprising triode 109 and associated components. The output of the cathode follower circuit is fed by capacitor 110 into resistor 111, which is of a relatively small value, for example 1000 ohms, whereas capacitor 110 is relatively large, being, for example, 10 mfd. Thus, there appears across resistor 111 a unidirectional waveform gate voltage of duration equal to that of the gate pulse fed into the grid of triode 109. This voltage waveform is then fed through diode 113 and through resistor 114 into capactior 115, which is threby charged by a small increment, the magnitude of the increment being proportional to the width of the gate pulse if the circuit parameters meet the conditions given below. Let resistor 114 be represented as $R_1$, resistor 116 as $R_2$ and capacitor 115 as C; let the duration of the gate be $t$ seconds; let the frequency of repetition of gate pulses in response to the production of sound pulses by the transmitter be $f$ pulses per second. If $R_1$, $R_2$, C, $f$ and $t$ are of such values that $t/R_1$ is much smaller than 1; so that $1/R_2$ is much smaller the 1; so that $R_2$ is much smaller than $R_1/ft$; then the voltage across capacitor 115 at equilibrium is given approximately by the expression:

$$e_0 = KR_2 tf/R_1$$

where K is a constant determined by the parameters of the other components of the electronics. Thus, the equilibrium voltage across C is proportional to $t$ and thus to travel time if $f$ is held constant as is done in practicing this form of the invention. Furthermore, the time constant of the circuit is such that the voltage across C reaches 90% of its equilibrium value after a time given approximately by the expression:

$$T_c = 2.3\ R_2 C$$

Furthermore, the relative magnitude of the ripple voltage across C at 90% of equilibrium is given approximately, as a percentage of the maximum voltage at 90% of equilibrium, by the expression $$e_{rip} = \frac{100}{fR_2 C}$$

Figure 10:
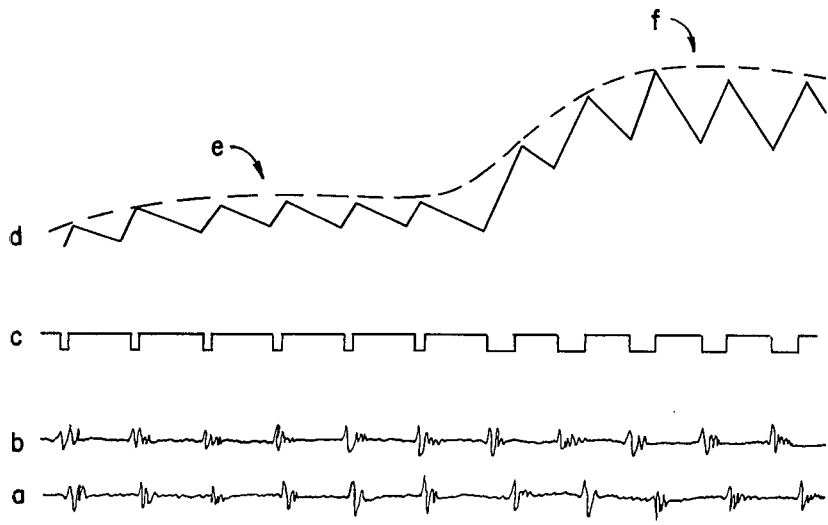
FIG. 10 shows waveforms produced by the circuitry of FIG. 9.

FIG. 10 illustrates the waveforms occurring in the circuits of FIGS. 8 and 9. Here the gate pulses are shown at $c$ as produced in response to the receiver transducer signals shown respectively at $a$ and $b$. At $d$ is shown the waveform of the voltage across capacitor 115. There is illustrated the effect of the downhole tool moving vertically from a region of high velocity as at $e$ to a region of lower velocity as at $f$. It is clear that the voltage across the capacitor fluctuates and that it changes gradually, during a time extending for several periods of pulse repetition as it changes from one equilibrium value to another.

For example, $R_1$ may be 10,000 ohms, $R_2$ 100,000 ohms; C may be 1 microfarad; the dc voltage at the cathode of vacuum tube 108 may be 100 volts; $f$ may be 1,000 pulses per second. Then, provided that the other components of the electronic circuitry are adjusted to operate satisfactorily, the equilibrium voltage across C will be approximately 10 volts when $t$ is 10 microseconds.

Further, under these conditions 90% of equilibrium voltage will be reached in approximately 0.23 seconds; and the ripple voltage will be approximately 1% or 0.1 volt.

The prupose of diode 112 is to preserve the voltage across resistor 111, which should be small, for example 1,000 ohms, at a constant value near zero except for the duration of gating pulses, during which it becomes equal to the constant K in the above equations.

From the foregoing it is thus clear that the voltage across capacitor 115 is proportional to the travel time of the acoustic pulse between transducers 13 and 13'. This voltage as shown in FIG. 9 passes through an amplifier comprising vacuum tube 117, through cable conductors 54 and 55 to recorder 26 where there is produced as described above a plotted curve indicating on a suitable scale the travel time of high frequency sound between transducers 13 and 13'.

Not shown, in FIGS. 8 and 9, are a duplication of the circuitry just described, interconnected between transducers 40 and 40' on the one hand at terminals 100, 101, 102 and 103 and a second channel of record 26 at terminals 104 and 105 on the other hand. In this way records are made simultaneously, as a function of depth, of the horizontal and vertical travel times between respective horizontally and vertically spaced transducers in the subsurface instrumentation.

In the foregoing description of a preferred embodiment of this invention, it has been noted that the method and apparatus described, the latter comprising a system, will record the travel time of acoustical waves traveling in the earth. As has already been pointed out with reference to FIG. 2, the apparatus can be made to respond preferentially to waves of any desired velocity by a corresponding suitable choice of the angle $\Theta$ between the normal to the surface of the earth material being measured and the axes of the directional transducers used. Thus, the preferred embodiment of the invention may be used to measure either compressional or transverse wave travel times or velocities by suitably controlling the angle $\Theta$ in the apparatus used. It has been found by experiment that the angle $\Theta$ need not exactly satisfy the conditions described with reference to FIG. 2, so that practice of the invention does not pre-suppose knowledge of the ultra-sonic velocity in the earth material being measured.

A particularly useful variation of this preferred embodiment of the invention involves the measurement of both compressional and transverse wave velocities, preferably simultaneously. Such measurments may be used to characterize earth materials. For example, a voltage related to the ratio of these two travel times may be formed by using the circuits of FIG. 13, or otherwise. When this is done, the ratio generally exceeds 2 for shales and is less than 2 for sandstones. Such compressional and transverse wave velocity measurements may be made simultaneously by providing in place of the structure of FIGS. 1 and 2 a second vertically spaced array of transducers or alternatively by providing on a second pad of the downhole tool a second vertically spaced array of transducers; with $\Theta$ being adjusted to a value suitable for transverse wave measurements in said second array of transducers. Or, alternatively, simultaneous transverse and compressional wave measurements may be made by use of a single vertical array of transducers in which $\Theta$ is adjusted to a value approximately suitable for transverse wave measurements, for example to 60°. With this last alternative both compressional and transverse waves are received, but the transverse wave signals are much larger than are those for the compressional waves, so that signals for the two types of waves may be separated on the basis of amplitude. Where one of these alternatives is used to obtain both vertical and horizontal measurements for both compressional and transverse waves, it is necessary, of course, to duplicate the electronic circuitry required for the two additional pairs of receiver signals.

Figure 11:
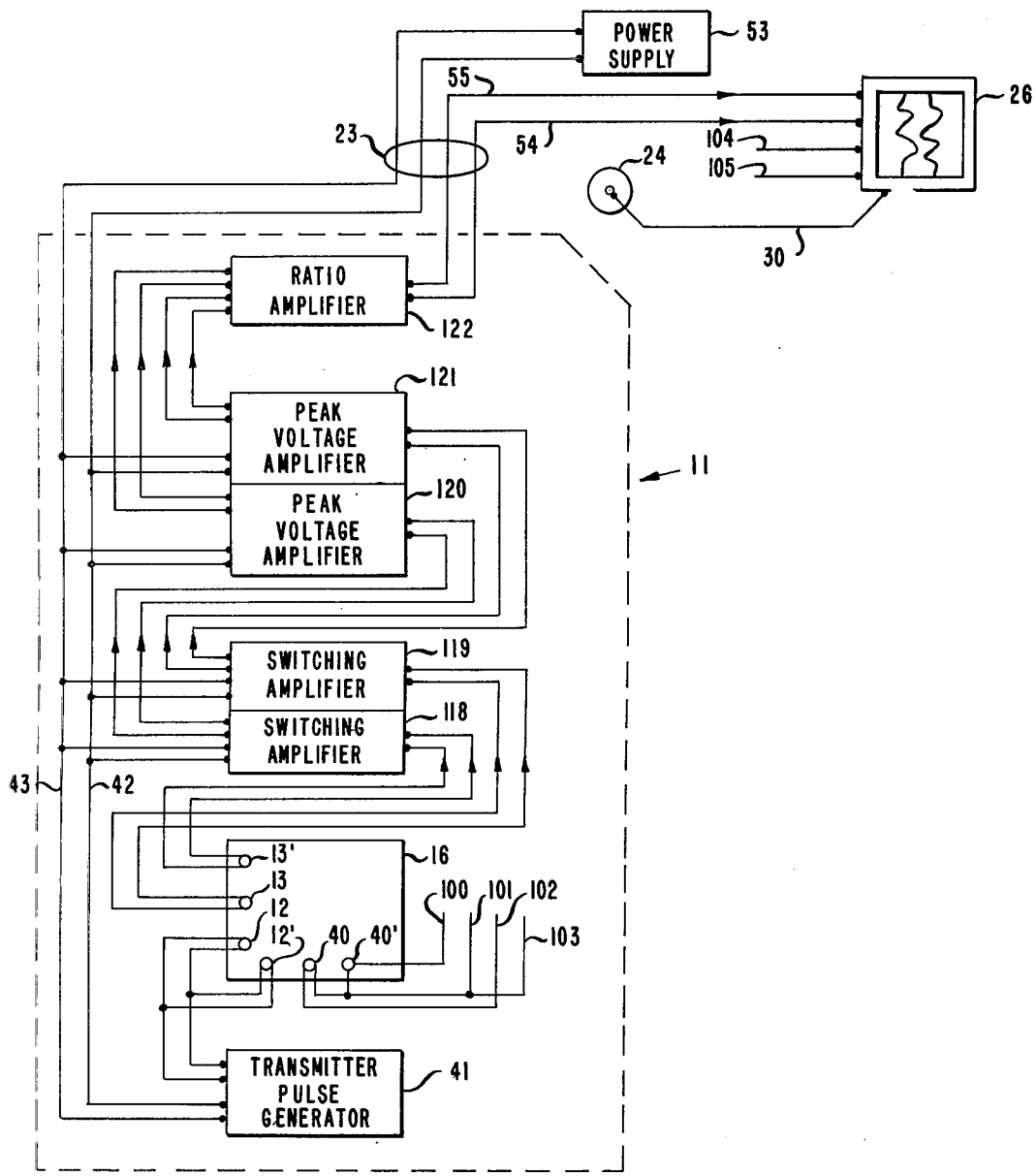
FIG. 11 is an alternative embodiment of the well logging system of FIG. 1 for measuring the attenuation properties of rocks, with the required electronic circuits shown in block diagram form.

Referring now to FIG. 11, there is here illustrated an alternative form of this invention in which the measured acoustical transmission properties of the earth relate to the amplitudes of received signals rather than the travel times or velocities. By means of the apparatus and method illustrated there are produced records which indicate the amplitude of received high frequency vibrations and the degree to which these are attenuated by propagating a short distance through earth materials.

The pad structure 16 may be identical with those described above, as also the transmitting pulse generator. Signals produced by the receiving transducers in response to waves impinging thereon are transmitted to respective switching amplifiers 118 and 119. In these amplifiers the signals are in part amplified and in part eliminated as illustrated by the waveforms of FIG. 12. Here it is shown that the 1st half cycle of the received signal for the respective receiving transducers is amplified and transmitted from the output, whereas other portions of the received signals are not transmitted but are eliminated from the output signal. The letters $a$ and $b$ show the receiver signals 13 and 13', respectively, and $c$ and $d$ show the waveforms of respective output signals from the switching amplifiers.

The modified signals from the switching amplifiers thus represent in effect the maximum amplitude of particular corresponding cycles of the receiver signals. These modified signals are transmitted to peak voltage amplifiers 120 and 121 which produce at their output terminals substantially DC voltages proportional to the peak amplitudes of the corresponding receiver input signals. These substantially DC output voltages are fed into a ratio amplifier 122 which produces an output voltage substantially proportional to the ratio of voltages from the respective receiver amplifiers. The output of the ratio amplifier is fed by means of connecting cable to the surface of the earth where it is recorded by a suitable recorder 26, in which the recording paper is moved in depth synchronism with vertical motion of the downhole tool by means of a depth measuring sheave 24 as described above with reference to FIG. 1.

Of course, it is possible to obtain useful results by transmitting to the surface signals from the subsurface receiver amplifiers and performing the ratio forming step at the surface. In this way the amplitudes of the individual receiver signals may be recorded separately if desired. Furthermore, if desired, useful results can be obtained by substituting for the peak voltage amplifiers of FIG. 11 the averaging circuits of FIGS. 8 and 9, and by using conventional amplifiers in place of switching amplifiers.

Figure 13:
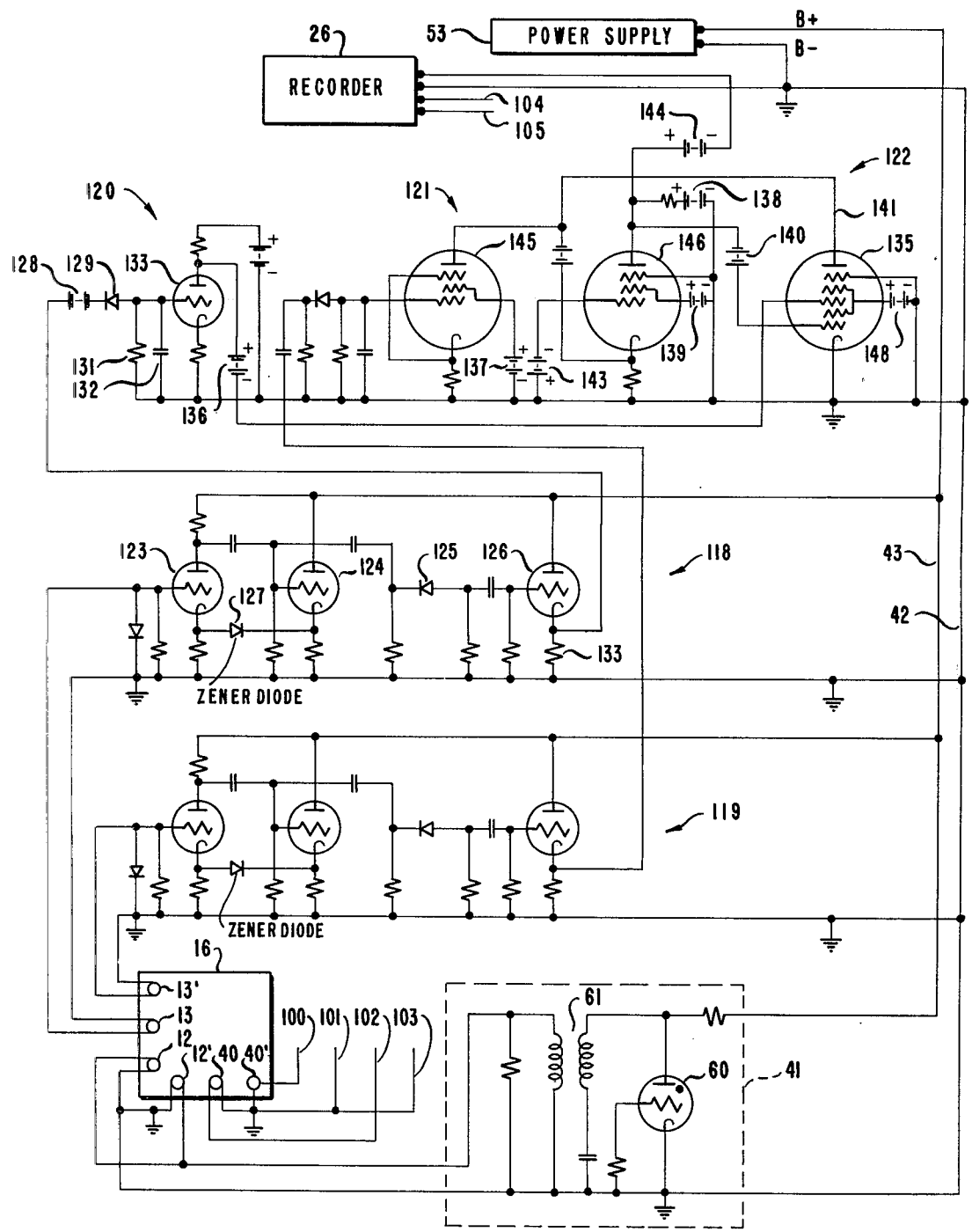
FIG. 13 is a schematic drawing of the electronic circuits required by the well logging system of FIG. 11.

Now with reference to FIG. 13, there is shown a more detailed description of the circuits outlined in FIG. 11. The transmitter pulser 41 is identical to that described with reference to FIG. 6 above. The receiver transducer signals are illustrated by FIG. 12 and are of the same form as described above. The signals begin with positive going excursions of voltage with respect to ground as measured at the first grids of the respective switching amplifier circuits 118 and 119. In the following the operation of the switching amplifiers will be described with reference to the diagram for switching amplifier 118, since the two switching amplifiers 118 and 119 are identical in connection and operation. The aforementioned receiver signal at the grid of triode 123, coming from receiver-transducer 13, causes a negative going fluctuation at the plate of the same vacuum tube, this vacuum tube constituting a plate loaded amplifier; and this fluctuation is coupled by capacitor to the grid of triode 124, which latter vaccum tube constitutes a cathode follower. Furthermore, the plate of vacuum tube 123 is coupled by capacitor to the cathode of diode 125 and thence to the grid of triode 126, which constitutes a plate loaded amplifier. Thus, the initial positive going transducer signal at the grid of triode 123 is amplified and appears on the cathode of vacuum tube 126. Because of the novel arrangement of the remainder of the circuit, this is the only portion of the transducer input signal which is represented in the output. The output of the cathode follower 124 is coupled through Zener diode 127 to the cathode of triode 123. The associated resistors are chosen of such value that the cathode of vacuum tube 124 is positive with respect to the cathode of vacuum tube 123, and that the voltage difference between the cathodes of tubes 123 and 124 is nearly equal to the Zener breakdown voltage for diode 127. As a result, the cathode of diode 127 is positive with respect to its anode and no current flows therethrough in response to the fluctuation resulting from the initial positive going input signal. The succeeding negative going portion of the input signal results in a positive going fluctuation at the plate of triode 123. This fluctuation cannot cause substantial current to flow through diode 125 because of its polarity, and as a result there is no corresponding signal appearing on the cathode of triode 126. However, this positive going fluctuation at the plate of tube 123 causes a positive going fluctuation at the cathode of tube 124 and as a result the Zener breakdown potential for diode 127 is exceeded and a positive feed back circuit is completed between tubes 123 and 124. The regeneration which follows causes the cathode of tube 123 to be driven sufficiently positive that plate current through tube 123 is cut off, so that the grid of tube 124 is driven very positive. Vacuum tube 123 then remains cut off until the large positive charge on the grid of tube 124 has leaked off sufficiently for the two tubes to revert to their stable condition by a subsequent regenerative action. Thus, on the cathode of tube 126 there appears only a single negative going fluctuation corresponding to an amplified first half cycle of the original receiver transducer signal. This signal from the cathode of 126 is transmitted to peak amplifier 120. Here the signal passes through battery 128, causing current to flow through diode 129 into capacitor 132, thus charging capacitor 132 to a voltage equal to the peak voltage of the fluctuation produced across resistor 131. The battery 128 has a voltage to buck out the DC drop across resistor 131; the output impedance of the cathode follower comprising tube 126 is low; the resistor 131 is large, for example 10 Megohms, and capacitor 132 may be 0.001 $\mu Fd$. With these conditions satisfied, the negative going fluctuation across resistor 131 is transmitted through diode 129 and charges capacitor 132 to a voltage equal to the peak value of the voltage of said negative going fluctuation appearing at the cathode of tube 126. This peak voltage is applied to the grid of triode 133 and results in a change of the voltage at the plate of triode 133 and results in a change of the voltage at the plate of triode 133 of a magnitude proportional to the magnitude of said peak voltage fluctuation. The voltage appearing at the plate of triode 133 is then coupled through a battery 136 to the second grid of tube 135.

In a manner similar to that described above with reference to switching amplifier 118 and peak voltage amplifier 120, the receiver transducer signal from transducer 13' passes through switching amplifier 119 and peak voltage amplifier 121 and causes to appear at the plate of vacuum tube 145 a positive going voltage fluctuation, the amplitude of which is proportional to the amplitude of the first half cycle of the signal produced by receiver transducer 13'. This voltage fluctuation is coupled through battery 137 to the cathode of vacuum tube 146.

Now vacuum tubes 135 and 146 with associated components constitute a circuit referred to in the foregoing as a ratio amplifier. The operation of the ratio amplifier will now be explained with reference to FIG. 13. The output voltage from this ratio amplifier is taken from the plate of vacuum tube 146, with the output lead being connected in series with battery 144. This output voltage is controlled by the ratio of the two voltages appearing respectively between ground and the cathode of tube 146 and between ground and the second control grid of tube 135. Vacuum tube 145 is a plate loaded amplifier, with the cathode resistance of the tube 146 constituting the plate load of tube 145. Tube 145 is a multi-grid, shield grid tube with high plate resistance, and the cathode resistor of tube 146 is chosen much smaller than the internal plate resistance of tube 145. Thus, there flows through the cathode resistor of tube 146 a current fluctuation component which is proportional to the voltage fluctuation at the grid of tube 145 and correspondingly there is produced at said cathode a voltage fluctuation component proportional to the peak voltage produced by the first half cycle of signal from transducer 13. Now tube 146 is connected as a grounded grid amplifier, with the input being applied between cathode and ground. Furthermore, negative feed back is provided between the input and the output of this amplifier, through the amplifier comprising vacuum tube 135 and its associated electronic components. Vacuum tube 146 is of the shield-grid variety and the amplifier circuit of which it is part, in the absence of negative feed back, would have high gain, for example a gain of 100. As is well known, the gain of a high gain amplifier with substantial negative feed back is the reciprocal of the gain of the feed back loop. In the circuit comprising vacuum tubes 146 and 135, the feed back loop has a gain of the order of unity, and therefore the gain of the feed back amplifier, as measured from the cathode to the plate of vacuum tube 146, is of the order of unity, and in any case is the reciprocal of the gain of the feed back loop. The gain of the feed back loop is measured from the first control grid of tube 135 to the cathode of tube 146. Now, tube 135 is connected in a circuit which constitutes an analog amplifier, that is to say, the variation of its plate voltage is proportional to the product of voltage variations introduced at its first and second control grids, respectively. A tube suitable for this application is the 6L7 tube. Thus, the gain of the negative feed back loop provided by the multiplier circuit comprising tube 135 is controlled by the voltage applied to second control grid of tube 135. Thus, the voltage at the plate of tube 146 fluctuates from its zero signal value by an amount proportional to the ratio of the voltage fluctuation (measured from the zero signal condition) at the cathode of tube 146 to the voltage fluctuation (measured from the zero signal condition) at the second control grid of tube 135, provided that suitable operating voltages are provided at the tube electrodes and that suitable values of resistors are provided as will be readily understood by those skilled in the art. For example, satisfactory results will be obtained if tube 145 has a transconductance of 5000 micromhos, tube 146 has a transconductance of 5000 micromhos, tube 135 is a 6L7; battery 148 has a voltage of 100 volts, battery 137 has a voltage of 250 volts, battery 138 has a voltage of 250 volts, battery 139 has a voltage of 100 volts, battery 136 is chosen to make the no-signal voltage at the second control grid of tube 136 16 volts negative with respect to the cathode of tube 135, battery 140 is chosen to make the zero signal voltage at the first control grid of tube 135 1 volt negative with respect to the cathode of tube 135; battery 143 is chosen to make the zero signal voltage of the control grid of tube 146 1 volt negative with respect to the cathode of tube 146; battery 147 has a voltage of 100 volts; the battery 144 has a voltage equal to the zero signal voltage at the plate of tube 146. Under these conditions, assuming conventional design for the remainder of the circuits, the voltage of conductor 142 will be approximately equal numerically to the ratio of the signal amplitude at transducer 13 to that at transducer 13'. Although supply voltage sources in FIG. 13 are indicated to be batteries, this is done to simplify the description, and it will be clear to those skilled in the art that other supply voltage sources may be used; furthermore, filament circuits are not shown, as the connections for these are obvious to those skilled in the art. Thus, the voltage on conductor 142 will be large when the sound pulse is greatly attenuated in traveling through the earth between the receiving transducers and will be a measure of the degree of attenuation.

Now shown, but indicated, in FIGS. 11 and 13, is a duplication of the circuitry just described, interconnected between transducers 40 and 40' on the one hand at terminals 100, 101, 102, and 103 and a second channel of recorder 26 at terminals 104 and 105 on the other hand. In this way records are made simultaneously, as a function of depth, indicating the horizontal and vertical amplitude attenuation between respective horizontally and vertically spaced transducers in the subsurface instrumentation.

Alternatively, the method and apparatus of this invention may be used to record simultaneously the variations of the amplitude of the signals at the nearer of a pair of receiver transducers and the ratio of the amplitudes of the signal by suitably connecting the apparatus described as will be obvious to those skilled in the art.

A particularly useful variation of this embodiment involves the use of transducer arrays in which the angle Θ is specially controlled, or in which amplitude separation is used to produce signals related to the magnitude of propagating transverse waves preferably simultaneously with the production of signals related to the magnitude of propagating compressional waves. These signals may be processed by the electronic circuitry described with reference to FIG. 13, or by other suitable means.

Although the foregoing description of this invention has recited the use of intermittently produced waves, it is, of course, possible to practice the invention by using continuous waves to measure transmission properties related to the amplitude of received signals. Where such continuous waves are used a considerable simplification of the electronic circuitry is possible. However, such use of continuous waves does not allow as good separation of transmission properties related respectively to transverse and compressional waves as is possible where intermittent waves are used. This is because the use of intermittent wave trains permit the use of receiver circuits gated to further discriminate against undesired waves.

While the present invention has been described with particular reference to its utility in logging acoustic transmission properties of the earth formations penetrated by a borehole to aid in oil exploration and production evaluations, the invention can also be advantageously used in measuring acoustic transmission properties of other materials for other purposes. For example, the invention is particularly useful in cement bond logging operations designed to indicate whether the cement has completely sealed the annular space between the casing and the earth formations. The main objective of the cementing job is the provision of a pressure resistant seal to prevent vertical movements of fluid between the casing and the surrounding materials. This objective can be defeated by vertical openings of hairline dimensions between the casing and the cement. Normally, cement bond logging systems involve an omnidirectional transmission of acoustic waves and the measurement of the velocities or amplitudes with which the waves arrive at vertically spaced receivers. Where the cement is not bonded to the casing, the acoustic waves propagate through the metal at a relatively high amplitude and an intermediate velocity of about 17,000 feet per second. Either transmission property can be used to recognize the presence or absence of a good bond. Where the acoustic waves are omnidirectionally transmitted and are measured after a vertical propagation, the influence of a small vertical opening may be overshadowed by the transmission properties of the bulk of the materials providing parallel paths through which the waves are propagated. By means of the present invention, this disadvantage can be avoided by measuring the horizontal transmission properties of the cemented casing along contiguous or overlapping horizontal intervals extending around the inner wall of the casing. In this type of measurement, the transmission properties are significantly affected by any minute deficiencies in the bond between the casing and the cement.

The present invention may also be adapted to measure the acoustic transmission properties of tubular materials, such as pipe lines, casing strings, and the like, to detect anomalies due to corrosion or flaws in the walls of the tubular materials. Where it is desired to scan circumferential sections of such conduits, the scanning can be accomplished in accordance with the present invention by providing a series of contiguous or overlapping intervals along the inner circumference of the conduit, either by using a plurality of transducer-containing pads or by sweeping a pair of transducers around the central axis of the conduit.

In view of the broad application of this invention to the logging of various types of elongated openings the term "borehole" is to include both cased and uncased boreholes as well as various tubular members.

Accordingly, this invention should not be limited to the preferred embodiments described above but only to its broad spirit and scope.

I claim as my invention:

1. Apparatus for examining a formation through which a borehole extends, comprising means for transmitting a beam of pulses of ultrasonic acoustic energy from the borehole into the formation to propagate substantially all of the acoustic energy in the formation as shear waves, the transmitting means including transducer means mounted in a housing of acoustic energy absorbing material, the housing being so formed that acoustic energy is transmitted from the transducer means in a beam into the formation so disposed with respect to the borehole wall that compression waves are substantially totally reflected from the borehole wall and are substantially totally absorbed by the acoustic energy absorbing material, receiving means in spaced relation to the transmitting means for generating an electrical signal in response to the acoustic energy received in the borehole from substantially only the shear wave acoustic energy in the formation, and means responsive to the transmitting means and to the electrical signal for determining the transmission time of the shear wave acoustic energy between the transmitting means and the receiving means.

2. Apparatus for examining a formation through which a borehole extends, comprising a housing of acoustic energy absorbing material adapted to be lowered into the borehole, means for urging the housing against the wall of the borehole, first and second means mounted in the housing for transmitting beams of ultrasonic acoustic energy from the borehole into the formation, the housing being so formed that the beams are disposed with respect to the borehole wall such that a maximum amount of shear waves and a minimum amount of compression waves are propagated into the formation, and first and second receiving means mounted in the housing for generating electrical signals in response to the acoustic energy received in the borehole from substantially only the shear wave acoustic energy in the formation in response to the first and second transmitting means respectively, the first transmitting and receiving means being aligned in a first plane and the second transmitting and receiving means being aligned in a second plane, the first and second planes being generally mutually perpendicular.

3. A method of examining a formation through which a borehole extends, comprising the steps of transmitting from a first electroacoustical transducer a beam of ultrasonic acoustic energy from the borehole into the formation so that substantially all of the acoustic energy in the formation is propagated as shear waves and so that compression waves are substantially totally reflected from the borehole wall, absorbing the acoustic energy transmitted outside of the beam and the compression waves reflected from the borehole wall, generating by a second electroacoustical transducer in spaced relation to the first electroacoustical transducer an electrical signal in response to the acoustic energy received in the borehole from substantially only the shear wave acoustic energy in the formation, comparing the amplitude of the electrical signal with the amplitude of a reference signal to determine the attenuation suffered by the shear wave acoustic energy, and measuring the transmission time of the shear wave acoustic energy between the first and second transducers.

4. Apparatus for examining a formation through which a borehole extends, comprising means for transmitting a beam of ultrasonic acoustic energy from the borehole into the formation to propagate substantially all of the acoustic energy in the formation as shear waves, the transmitting means including transducer means mounted in a housing of acoustic energy absorbing material, the housing being so formed that acoustic energy is transmitted from the transducer means in a beam into the formation so disposed with respect to the borehole wall that compression waves are substantially totally reflected from the borehole wall and are substantially totally absorbed by the acoustic energy absorbing material, receiving means in spaced relation to the transmitting means for generating an electrical signal in response to the acoustic energy received in the borehole from substantially only the shear wave acoustic energy in the formation, and means responsive to the electrical signal for determining attenuation suffered by the shear wave acoustic energy between the transmitting means and the receiving means.

5. Apparatus according to claim 4, including means responsive to the electrical signal for determining the transmission time of the acoustic energy between the transmitting means and the receiving means.

* * * * *